United States Patent [19]

Stanfill

[11] Patent Number: 4,611,294
[45] Date of Patent: Sep. 9, 1986

[54] METHOD OF AND APPARATUS FOR MONITORING ODORIZER PERFORMANCE

[76] Inventor: Ira C. Stanfill, 4732 Kenmar Cove, Memphis, Tenn. 38128

[21] Appl. No.: 605,851

[22] Filed: May 1, 1984

[51] Int. Cl.⁴ .................................... G05D 11/13
[52] U.S. Cl. .................................... 364/173; 48/195; 137/3; 137/88; 137/551; 364/502; 364/510
[58] Field of Search .............. 364/172, 173, 502, 509, 364/510; 137/3, 9, 87, 88, 101.21, 101.31, 551, 624.11; 261/DIG. 17, 76; 48/195

[56] References Cited

U.S. PATENT DOCUMENTS

| | | | |
|---|---|---|---|
| 1,930,848 | 10/1933 | Ashley et al. | 261/76 |
| 2,058,508 | 10/1936 | Rolle | 261/76 |
| 2,166,370 | 7/1939 | Putnam et al. | 137/88 |
| 2,178,519 | 10/1939 | Gill | 261/119 |
| 2,180,584 | 11/1939 | Green et al. | 48/195 |
| 2,261,590 | 11/1941 | Rutherford et al. | 48/195 |
| 2,535,752 | 12/1950 | O'Connell | 137/3 |
| 3,235,348 | 2/1966 | Witcher | 48/195 |
| 3,259,141 | 7/1966 | Brendon | 137/3 |
| 3,452,774 | 7/1969 | Stanton | 137/101.31 X |
| 3,843,099 | 10/1974 | Duncan | 137/88 X |
| 3,907,515 | 9/1975 | Mulliner | 48/195 |
| 4,007,755 | 2/1977 | Lerner et al. | 137/101.21 |
| 4,008,829 | 2/1977 | Chandra et al. | 364/173 X |
| 4,034,774 | 7/1977 | Clymer et al. | 137/111 |
| 4,215,409 | 7/1980 | Strowe | 137/3 X |
| 4,324,294 | 4/1982 | McLoughlin et al. | 137/88 X |
| 4,333,356 | 6/1982 | Bartels et al. | 364/502 X |
| 4,538,222 | 8/1985 | Crain et al. | 364/172 |

*Primary Examiner*—Joseph Ruggiero
*Attorney, Agent, or Firm*—Fleit, Jacobson, Cohn & Price

[57] ABSTRACT

A method and apparatus for monitoring the rate of addition of an additive fluid that is to be added to a main fluid stream in a gas pipeline system. A monitoring interval is defined by selecting a base measurement parameter, and the flow rate of the main gas stream and of the additive fluid are measured during the monitoring interval. The average ratio of additive fluid flow to the main gas stream flow during the monitoring interval is calculated by a data logger, that displays and records the result and the date and time of day that the ratio calculation is made. The monitoring intervals can be defined by a predetermined quantity of odorant flow, a predetermined quantity of main gas flow, or a particular period of time.

16 Claims, 6 Drawing Figures

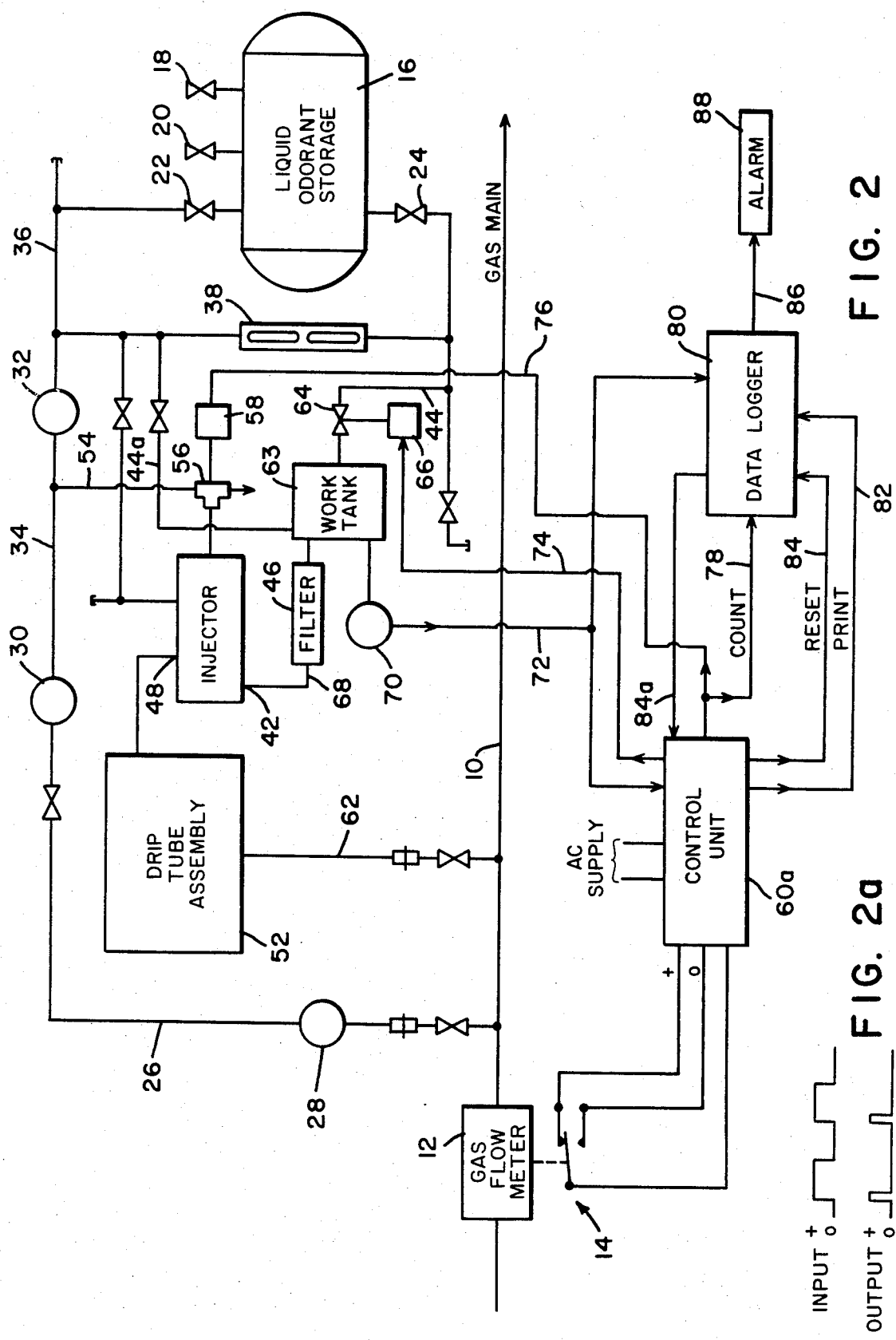

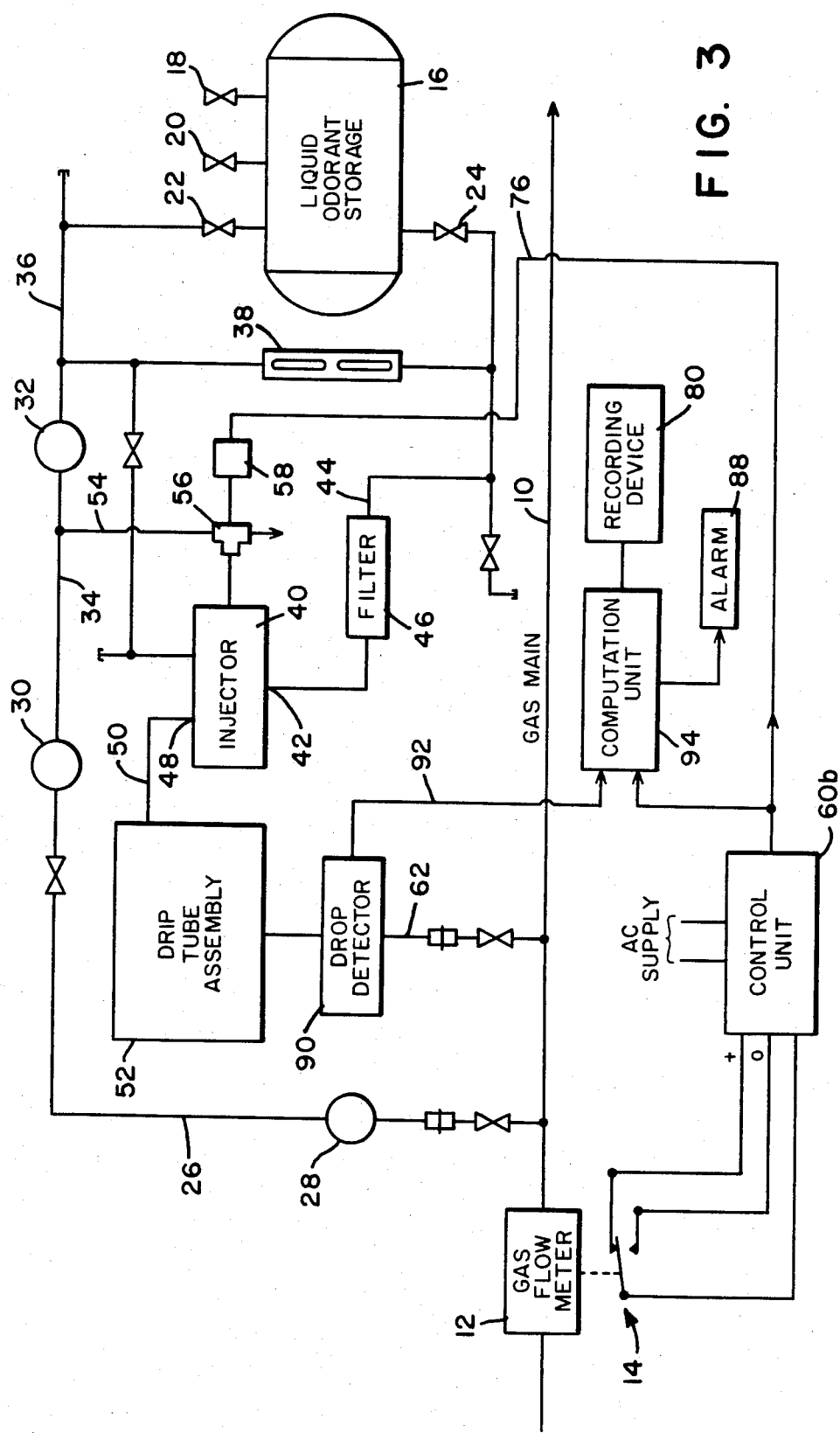
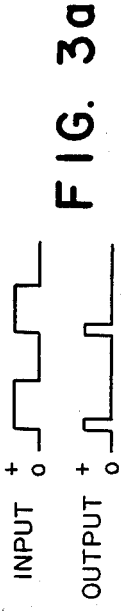
FIG. 3
FIG. 3a

METHOD OF AND APPARATUS FOR MONITORING ODORIZER PERFORMANCE

BACKGROUND OF THE INVENTION

1. Field of the Invention

This invention relates to odorizing systems for odorizing combustible gases and, more particularly, to a system including means for continuously monitoring the rate of odorant introduction into a pipeline that carries a combustible gas.

2. Description of the Prior Art

Natural gas is widely utilized in residential and industrial heating applications because it is a clean and efficient fuel for heating purposes. The gas is a mixture of light hydrocarbon gases which are found in the earth's crust, principally methane. In its natural form it is colorless and odorless, and therefore an odorizing agent is added to the gas in an amount sufficient to permit detection of the gas by smell and thereby identify when unintended flow or leakage of the gas is taking place.

The odorant materials most frequently used are mercaptans, which are organic compounds that contain sulphur and have a disagreeable odor that is easily detectable, even in extremely small amounts in the parts per billion range.

Natural gas pipeline systems have heretofore included means for periodic injection into the gas stream of a liquid odorant and the mixing of the odorant and gas as they travel through a pipeline in an effort to maintain a relatively constant odorant to gas ratio over the entire range of gas flow rates. The range of gas flow rates can vary widely, up to about 20:1, depending upon the season of the year and the user demand. Because the odor given off by the odorant is relatively strong, the presence of the odorant is easily detected and, therefore, only a very small quantity of odorant is needed to provide the necessary odorization. As a result, the amount of odorant required to be injected into a gas stream is in many instances far below the operating range of available liquid flow-meters. Typical odorant injection quantities range from about one-half to one and one-half pounds of odorant per million cubic feet of gas.

In the past, reliance has been placed upon the effective operation of the injection apparatus, and it has been assumed that the odorant was being injected as necessary and in the desired amount. However, because the odorizing equipment is normally installed at a location adjacent to the gas pipeline to be odorized, at a compressor station, or the like, and because that location is usually remote and unattended, any failure or malfunction of the odorizing equipment might not be detected and could result in the gas being inadequately odorized until the failure or malfunction is discovered and then corrected. In the meantime, inadequately odorized gas could be conveyed and any leakage or unintended flow could go undetected. Because of the safety hazard involved in the leakage of a combustible gas such as natural gas, which is explosive when mixed with air, some means for continuously monitoring the performance of the odorizer system is desirable in order to permit a rapid determination of any malfunction of the odorant addition operation. Additionally, it is desirable to provide a means to record the performance of gas odorizer systems, in terms of the amount of odorant actually added to the gas stream, in order to be able to demonstrate the proper operation of the odorant addition operation when called upon to do so.

SUMMARY OF THE INVENTION

It is an object of the present invention to provide a method of and apparatus for measuring the flow of an additive fluid to be added to a main fluid stream.

It is another object of the present invention to provide a method of and an apparatus for automatically and continuously monitoring the ratio of an additive fluid to a main fluid stream.

It is a further object of the present invention to provide a method of and an apparatus for making a time-averaged determination of the quantity of flow of an additive fluid relative to the quantity of flow of the main fluid in a gas pipeline system.

It is still another object of the present invention to provide a method of and an apparatus for measuring and controlling the level of odorant in a work tank prior to injection of the odorant into a gas main.

It is still a further object of the present invention to provide a method of and an apparatus for measuring and monitoring the flow of drops of additive fluid which are added to a main gas stream in a gas pipeline system.

Briefly stated, in accordance with one aspect of the present invention, a method is provided for monitoring the performance of an odorizer system in a gas pipeline involving selecting a base measurement parameter which defines a monitoring interval, and measuring both the main gas stream flow and the additive flow during the monitoring interval. The average ratio of additive fluid flow to the main gas steam flow during the monitoring interval is calculated, and the result is displayed and recorded, together with the time the measurements and calculation are made.

BRIEF DESCRIPTION OF THE DRAWINGS

FIG. 2 is a schematic view of one form of odorizer monitoring system in accordance with the present invention and utilizing an odorant work tank with a level sensor and odorant addition monitoring apparatus.

FIG. 2a shows some of the input and output signals for the odorant flow control unit.

FIG. 3 is a schematic view of another form of odorizer monitoring system in accordance with the present invention and wherein the odorant is introduced in drop form, a drop detector is provided to sense the rate of odorant addition, and the odorant addition is monitored.

FIG. 3a shows the input and output signals for the odorant flow control unit.

DESCRIPTION OF THE PREFERRED EMBODIMENTS

Figure 1:
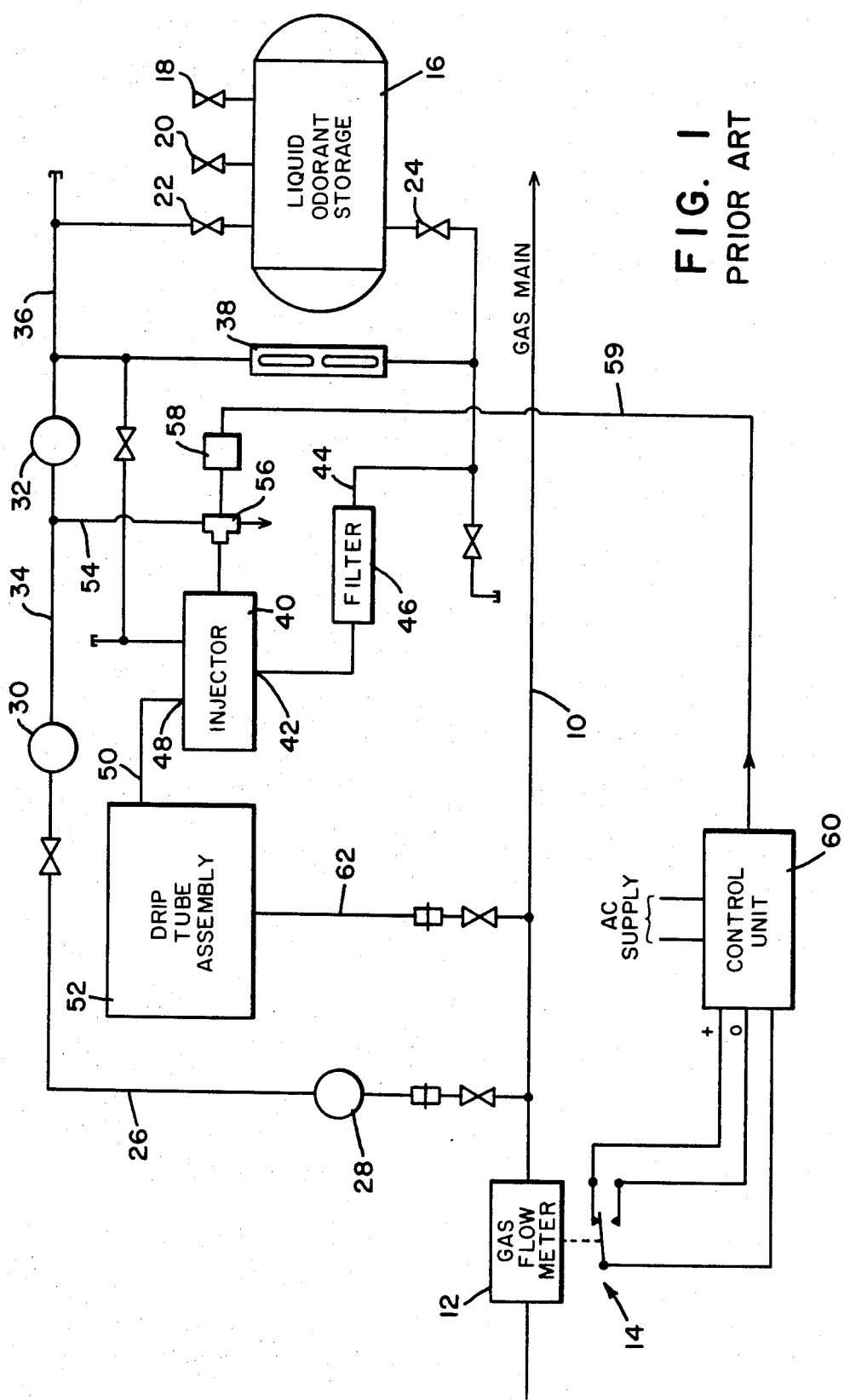
FIG. 1 is a schematic view of a known odorant additive system for a natural gas supply system.

Referring now to the drawings, and particularly to FIG. 1 thereof, there is shown a gas main 10 that includes a flow meter 12 for determining the rate of flow of a main fluid stream, such as natural gas. Flow meter 12 can be of any of a number of types of flow measuring devices known to those skilled in the art, such as an orifice plate primary element followed by an electronic gas flow computer, such as Daniel Industries, Inc., Series 2231, so configured as to conform with American Gas Association Gas Measurement Committee Report No. 3. Another suitable gas flow meter is American Meter Company Model No. 54738A007 equipped with a base volume index continuous integrator, model 100, and which utilizes a shaft rotated by the flowing gas to generate electrical pulses, the shaft speed and resulting pulse frequency being dependent upon the gas flow rate. The latter operates by rotating a cam that closes and opens a switch 14 once per revolution, to correspond to a predetermined gas flow quantity, such as, for example, 50 cubic feet or 100 cubic feet per revolution.

A liquid odorant storage tank 16 is provided in order to contain a sufficient quantity of odorant for a prolonged operating period of several months. Tank 16 includes a fill valve 18, a vent valve 20, a pressurizing valve 22, and an odorant outlet valve, 24. The odorant in tank 16 is pressurized by means of the pressure in gas main 10 through pressurizing line 26, which can include pressure reducers 28, 30, and 32 to provide any of several desired pressure levels at various points in the system. For example, if the pressure in pressurizing line 26 is from, for example, 50 to 100 psi, the pressure in line 34 downstream of pressure reducer 30 can be, for example, 25 psi, and that in line 36 downstream of pressure reducer 32 can be, for example, 5 psi in order to provide a small positive pressure on the liquid within odorant storage tank 16.

A liquid level gauge 38 is provided to permit a visual determination to be made of the quantity of liquid odorant in tank 16. Connected in parallel with liquid level gauge 38 is an odorant injector 40 that includes an odorant inlet 42 in communication with odorant outlet valve 24 through line 44, within which a filter 46 is preferably provided. Examples of suitable odorant injectors are those manufactured by Williams Instrument Company under Model Designations DSP125, DSP500, and DSP1000. Injector 40 is basically a piston-cylinder arrangement, with pressurized odorant provided at the inlet 42 thereof, and which causes the odorant to be injected through odorant outlet 48 and line 50 into a drip tube assembly 52. Injector 40 is at intervals placed in communication with a source of pressure in line 54 through pressurizing valve 56, which, in turn, is operated by solenoid 58. The operation of solenoid 58 is governed by a control unit 60, to be hereinafter described, to cause solenoid 58 to momentarily open valve 56 to permit a pressure pulse to be applied to the piston in injector 40 and thereby cause the injection of a predetermined quantity of odorant. The amount of liquid odorant injected per stroke depends upon the diameter and the length of the stroke of the piston, and the drip tube assembly into which the odorant is injected includes a chamber with a small opening and a sight glass that converts the periodic injections of odorant into evenly spaced drops that fall by means of gravity into gas main 10 through conduit 62. One suitable form of drip tube assembly is manufactured by the Williams Instrument Company and designated SFIA.

Odorant injector 40 is controlled by the gas flow that passes through flow meter 12, in accordance with a predetermined preferred odorant to gas ratio, so that the odorant is not introduced in excessive amounts beyond that necessary for detection purposes, and so that it also is present in a sufficient quantity that it can be readily detected by smell in the event of leakage of the natural gas-odorant mixture. In the Williams injector the ratio is set by mechanical adjustment on the plunger which limits the stroke length. The longer the stroke, the more odorant is injected per stroke. Alternatively, if desired, a suitable computer (not shown) could generate the signal for the injector on the basis of the gas flow rate through meter 12 and the injector operating rate could be set electronically by a front panel control to set the proper odorant to gas ratio.

Downstream of the point of introduction of the odorant, the natural gas and the odorant intermix as the gas flows through the pipeline system, and any locally high concentrations of odorant caused by intermittent introduction are effectively dissipated as the natural gas passes through the system. Thus, a relatively uniform odorant level is provided.

Figure 1A:
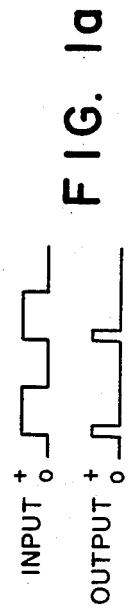
FIG. 1a shows the input and output signals for the odorant flow control unit.

Control unit 60 receives input signals in the form of pulses from switch 14 at a frequency proportional to the gas flow rate and provides an output signal at appropriate time intervals to solenoid 58, to thereby cause injector 40 to operate and inject a predetermined quantity of liquid odorant into drip tube assembly 52. Control unit 60 converts the square wave input signal from cam operated switch 14 to a short duration pulse output, as shown in FIG. 1a.

Referring now to FIG. 2, there is shown an odorant flow monitoring arrangement in accordance with the present invention, and as applied to the flow system described hereinabove and illustrated in FIG. 1. An odorant work tank 63 is provided, which is of a smaller volume than odorant storage tank 16, and serves to contain sufficient odorant for the duration of a monitoring interval, to be hereinafter described. Work tank 63 is in communication with storage tank 16 through line 44, in which a flow control valve 64 is positioned and is operated by solenoid 66 in order to control the flow of odorant from storage tank 16 to work tank 63. A work tank discharge line 68 provides communication between work tank 63 and odorant injector 40 through filter 46. A pressure equalizing line 44a connects the vapor space of work tank 63 with the vapor space of storage tank 16. Work tank 63 includes a level sensor 70 that senses the level of the liquid odorant and provides output signals proportional thereto, and indicative of odorant usage, which serve as input quantities for control unit 60a, the function of which will hereinafter be described. The work tank level change permits a more accurate determination of odorant usage, particularly in those situations involving very low rates of usage, than would a determination of level change in substantially larger storage tank 16.

The size of work tank 63 will be influenced by the odorant usage rate for the gas stream being odorized, the basis for selecting the monitoring interval, and the sensitivity of level sensor 70. For example, in a particular installation, work tank 63 may preferably be of such a size that it requires filling no more frequently than once every hour or so, which would correspond with a high usage situation as would normally occur during the winter heating season. During the summer, however, when natural gas usage for heating purposes is substantially less, a work tank of such size may need to be refilled about every twenty hours or so. The filling frequency is of course a function of gas flow rate. Additionally, in order to minimize the period of time between the end of one monitoring interval and the beginning of the next, the size of flow control valve 64 is preferably such that refilling of the work tank can occur in a relatively short time span, say, one minute or less. Odorant is available for injection at all times, because the injector can function during the refilling interval.

As shown in FIG. 2, control unit 60a receives the pulse signals from switch 14 and also receives along line 72 as another input quantity an odorant work tank level indication in the form of a signal from odorant work tank level sensor 70. One output from the control unit 60a is a signal along line 74 that controls the operation of solenoid 66 of valve 64 to refill odorant work tank 63. Another output from control unit 60a is a signal along line 76 that controls the operation of solenoid 58 of valve 56 to operate injector 40 as necessary.

As shown in FIG. 2, a further output from control unit 60a is provided along line 78 to a data logger 80 that can be arranged to count the number of output pulses to solenoid 58, which pulses are proportional to gas flow volume, and to print the data and time for an observation, together with the computed ratio of the odorant flow to the gas flow, the computation of which is performed by data logger 80. Additional outputs from control unit 60a to data logger 80 include a print signal along line 82 and a reset signal along line 84. The print signal causes the printer of data logger 80 to operate to provide the desired output and at desired time intervals. The reset signal resets the counter at the start of each monitoring interval. An additional input to data logger 80 is the level indication signal from level sensor 70. A further output from data logger 80 along line 84a can signal control unit 60a when a predetermined gas flow volume has occurred or at predetermined time intervals. Data logger 80 can further provide an output signal along line 86 to activate an alarm 88 at a manned control location distant from the remote location at which the odorant is normally injected. The alarm can serve to alert operating personnel in the event of a malfunction of the odorant injection system, such as no odorant injection, low odorant injection, above or below a predetermined ratio of odorant to gas, in order that suitable corrective action can be taken. An example of a suitable data logger that can be used in the above-described system is the Autodata Ten Series Calculating Data Logger/Control System manufactured by Acurex Company.

In the operation of the system hereinabove described and shown in FIG. 2, a monitoring interval is first selected. The monitoring interval can be defined by one of several parameters to provide three different modes of control. The first mode involves the selection of a predetermined quantity of odorant injected to define the monitoring interval. As a second mode, the time interval during which a predetermined quantity of gas flows through the gas flow meter can be used to define the monitoring interval. Third, a predetermined period of time can be selected to serve as the monitoring interval.

Considering first the mode of operation wherein the monitoring interval is defined by a predetermined quantity of odorant flow, odorant work tank 63 is initially filled to a predetermined upper level by a signal from control unit 60a, which causes solenoid 66 to open control valve 64, thereby permitting liquid odorant in odorant storage tank 16 to flow into the work tank. When work tank 63 is filled to its upper level, level sensor 70 signals control unit 60a which then commences a monitoring interval by simultaneously sending a signal to solenoid 66 to close valve 64, and a signal to data logger 80 to reset its count register to zero and commence counting. The gas flow quantity is sensed by control unit 60a which provides signals to odorant injector 40 to cause the release of odorant in an amount to provide the desired ratio of odorant to gas and to data logger 80 to totalize the gas flow. When the level of odorant in work tank 63 reaches a predetermined lower level such that the difference between the upper and lower levels corresponds with the predetermined quantity of odorant flow desired to be passed into gas main 10, the level sensor provides another signal to control unit 60a signifying the end of the monitoring interval. Data logger 80 can provide the volumetric flow of gas through the main 10 during the monitoring interval involved and can divide that quantity into the predetermined volume of odorant which has passed into the system during that same interval to thereby provide a time averaged ratio of odorant to gas during the monitoring interval. Data logger 80 can be arranged to print desired output quantities in order to provide a periodic record of the operation of the system. The output information can include the date, the time, the quantity of gas, the quantity of odorant, and the ratio of odorant to gas if the system is so configured. The operating cycle then repeats itself by the control unit 60a controlling the solenoid operated valve 64 to permit refilling of work tank 63. The monitoring system thus provides a permanent record of the gas and odorant flow quantities for given time intervals during the course of operation. Additionally, if the odorant to gas ratio deviates from a predetermined value, as pointed out above, a suitable alarm signal can be provided by alarm 88 to alert someone of a possible malfunction and that corrective action is necessary.

In the second mode of operation, the monitoring interval is defined by a predetermined quantity of gas. In this mode the system operates in the same way as it did in connection with the mode wherein the quantity of odorant was the determinant of the time interval, except that the output of the desired information and the refilling of odorant work tank 63 occurs immediately after the desired quantity of gas has passed through the flow meter. In this instance, however, the data logger signals control unit 60a to end the monitoring interval and also determines the quantity of odorant which has passed through the odorant work tank by converting the liquid level change during the monitoring interval into odorant volume. Immediately thereafter, a signal is provided to solenoid operated valve 64 to permit work tank 63 to refill. Level sensor 70 provides a level signal to control unit 60a which, in turn, causes valve 64 to close when tank 63 is full whereupon the next cycle automatically commences.

In the third mode of operation, a particular period of time is selected as the monitoring interval, and data logger 80 must determine the quantity of gas that has passed through the system during that time interval, as well as the quantity of odorant that has passed through work tank 63. Again, as in the previous modes, the data logger is arranged to output the date, the time, the gas and odorant quantities, and the ratio between the latter.

Referring now to FIG. 3, there is shown an alternative odorant flow monitoring arrangement wherein the odorant work tank and its associated level sensor of FIG. 2 are eliminated, and liquid odorant storage tank 16 feeds odorant injector 40 directly. Injector 40, in turn, injects the odorant into drip tube assembly 52 and a drop detector 90 senses the drops of liquid odorant and provides a suitable signal along line 92 in the form of pulses to computation unit 94 which, in turn, determines the ratio of odorant quantity to gas quantity being provided in gas main 10. The modes of operation for this embodiment are the same as those described in connection with the embodiment illustrated in FIG. 2, and one principal difference between the two embodiments is that the time delay resulting from the necessity to periodically fill the odorant work tank 63 is no longer present, thereby permitting successive and uninterrupted readings to be made during successive time periods. Another principal difference is that the ratio of odorant to gas may be determined with each successive drop, thereby achieving a greatly reduced monitoring interval of a few seconds, instead of hours.

Prior to operating the system illustrated in FIG. 3, a calibration must be made for the particular odorant utilized in order to determine the average volume of odorant per drop. Computation unit 94 counts the drops over the selected monitoring interval to determine the amount of odorant injected, and from which the gas to odorant ratio is determined.

In addition to counting the pulses from control unit 60b and drop detector 90 to determine the ratio of odorant flow to gas flow, the computation unit can be provided with a suitable clock and arranged to measure the time interval between two successive pulses from the control unit, which pulses are proportional to gas flow, and the time interval between two successive pulses from the odorant drop detector, which pulses are proportional to odorant flow, and to divide the latter into the former to arrive at the computed ratio in accordance with the following equation:

$$Rm = K \frac{T_f}{T_o}$$

wherein,
Rm is the computed ratio;
K is a scaling constant;
$T_f$ is the time interval between pulses from the control unit; and
$T_o$ is the time interval between pulses from the drop detector.

In this instance, the monitoring interval is defined by the time interval between two successive pulses.

Although the foregoing description has proceeded based upon the application of the present invention to natural gas odorizers, the same method and apparatus could be applied to monitor and record the performance of liquid propane gas odorizers, or any other additive system wherein the additive flow rate is too low to measure by means of commercially available flow meters.

While particular embodiments of the present invention have been illustrated and described, it will be apparent to those skilled in the art that various changes and modifications can be made without departing from the spirit and scope of the invention, and it is intended to encompass, in the appended claims, all such changes and modifications that fall within the scope of the present invention.

What is claimed is:

1. A method of monitoring the addition of an additive fluid that is to be added to a flowing main fluid stream, said method comprising:
   (a) selecting a base measurement parameter defining a monitor interval;
   (b) selecting a predetermined desired ratio of additive fluid flow volume to main fluid flow volume;
   (c) determining the volume of main fluid flow during said monitoring interval;
   (d) introducing a quantity of an additive fluid to the main fluid stream in the form of drops during said monitoring interval;
   (e) calculating the time averaged ratio of additive fluid volume to main fluid volume during the monitoring interval; and
   (f) recording the ratio of volume of the additive fluid stream to the volume of the main fluid stream, and the time that the ratio calculation is made.

2. The method of claim 1 wherein said base measurement parameter is a predetermined quantity of additive fluid.

3. The method of claim 1 wherein said base measurement parameter is a predetermined quantity of main fluid.

4. The method of claim 1 wherein said base measurement parameter is a predetermined time.

5. The method of claim 1 including the step of activating an alarm when the ratio of additive fluid to main fluid deviates from a predetermined value.

6. The method of claim 1 wherein said additive fluid flow quantity is determined by detecting the change of level of said additive in a work tank during said monitoring interval.

7. The method of claim 1 wherein said additive fluid flow quantity is determined by detecting the number of drops of additive fluid added during said monitoring interval.

8. The method of claim 1 wherein said additive fluid flow quantity is determined by detecting and measuring the time interval between drops of additive fluid, said time interval defining the monitoring interval.

9. Apparatus for monitoring the addition of an additive liquid to a flowing main fluid stream, said apparatus comprising:
   (a) a conduit for carrying a main fluid stream;
   (b) means to measure the volumetric flow rate of said main fluid stream and to produce a signal proportional thereto;
   (c) additive liquid storage means;
   (d) means to intermittently introduce additive liquid from said additive liquid storage means into said main fluid stream;
   (e) means to measure the volume of additive liquid added to the main fluid stream;
   (f) means to provide a predetermined input ratio of additive liquid volume to main fluid volume;
   (g) means to determine and provide an output indication of a computed ratio of additive liquid flow to main fluid flow;
   (h) control means responsive to said computed ratio to control the rate of addition of additive liquid to maintain the amounts of main fluid and additive liquid in said conduit at said predetermined ratio; and
   (i) recording means for recording said computed ratio at predetermined time intervals.

10. The apparatus of claim 9 wherein said means to introduce additive liquid includes a work tank having a capacity smaller than that of said additive liquid storage means, and additive injection means to periodically inject discrete quantites of additive liquid periodically from said work tank to said conduit.

11. The apparatus of claim 10 wherein said work tank includes a level sensor to determine the level of additive therein and provide an output signal proportional thereto to said control means.

12. The apparatus of claim 9 wherein said means to introduce additive fluid includes additive injection means and drip formation means connected between said additive injection means to form drops of additive for addition to said main fluid stream.

13. The apparatus of claim 12 including drop detection and counting means to detect and count the drops of said additive fluid and to provide a signal proportional thereto.

14. The apparatus of claim 12, including drop detection means to detect and measure the time interval between drops of said additive fluid and to provide a signal proportional thereto.

15. The apparatus of claim 9 including alarm means responsive to said computed ratio to provide an alarm signal when said computed ratio deviates from a predetermined value.

16. The apparatus of claim 9 wherein said means to intermittently introduce additive liquid adds said liquid in the form of drops.

* * * * *